June 6, 1961

E. W. LANCASTER ET AL 2,986,949

INDEXING CAM STRUCTURE

Filed Nov. 27, 1959

Inventors
Edward W. Lancaster
Howard H. Evans
By Frost & Vandenburgh
Attorneys

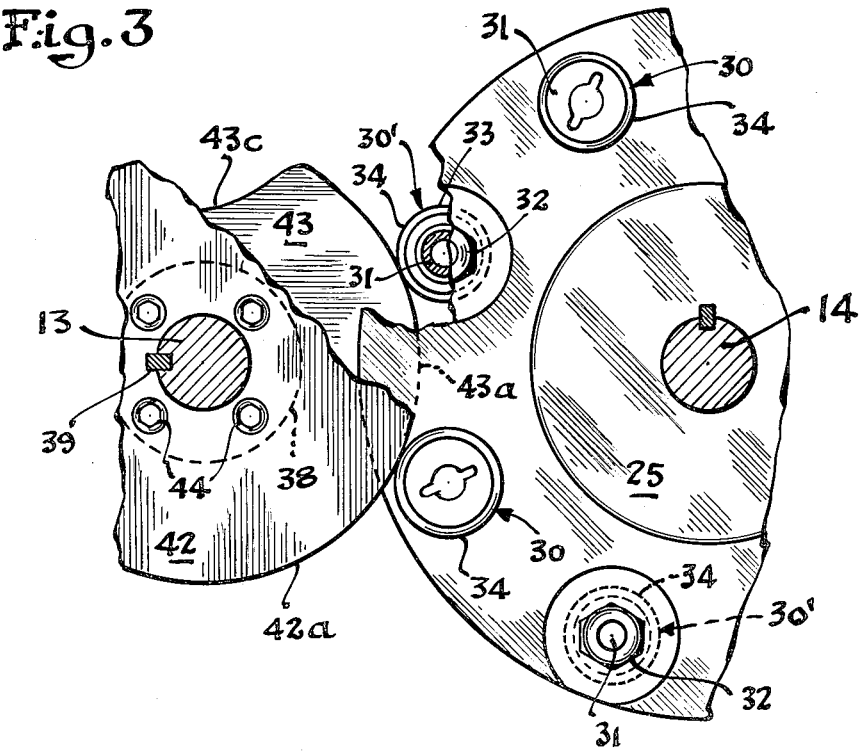
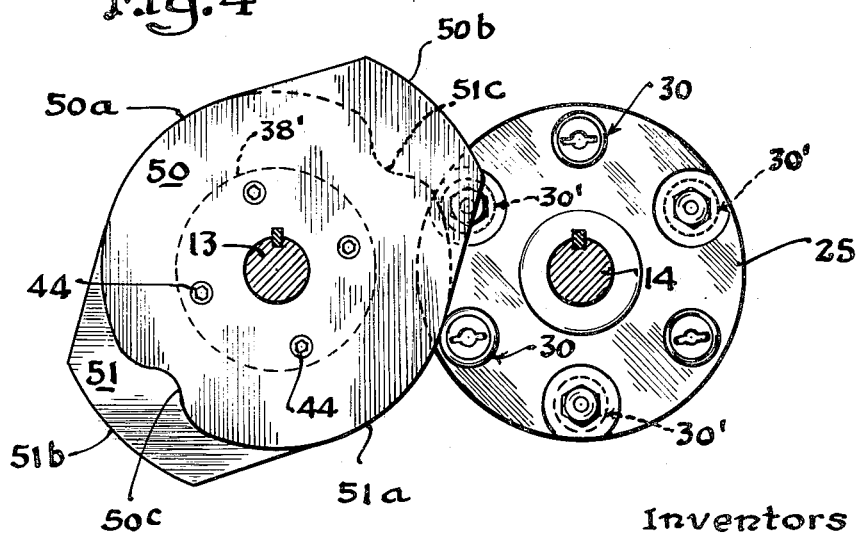

June 6, 1961  E. W. LANCASTER ET AL  2,986,949
INDEXING CAM STRUCTURE
Filed Nov. 27, 1959  3 Sheets-Sheet 3

Inventors
Edward W. Lancaster
Howard H. Evans
By Frost & Vandenburgh
Attorneys

United States Patent Office 2,986,949
Patented June 6, 1961

2,986,949
INDEXING CAM STRUCTURE
Edward W. Lancaster, Chicago, and Howard H. Evans, La Grange Park, Ill., assignors to Commercial Cam & Machine Co., Chicago, Ill., a corporation of Illinois
Filed Nov. 27, 1959, Ser. No. 855,735
9 Claims. (Cl. 74—84)

The present invention relates to an indexing cam structure.

Indexing cams are utilized in all types of machinery. They have many qualities which make them particularly desirable for use in various types of automatic apparatus. However, where a high degree of accuracy is required in the output or indexed shaft, the existing types of structures require that they be manufactured to very exact degrees of tolerance. This makes such structures expensive to construct, and with periods of use the wear encountered is likely to cause them to lose their accuracy.

The principal object of the present invention is to provide an indexing cam that has an exceptional degree of accuracy of the output shaft, yet which is so constructed that it may be manufactured much more inexpensively than is generally true of the devices available today. There are numerous features of our invention that contribute to achieving this over-all result. One of these is that the structure uses a pair of conjugate cams, which are utilized in such a way that it is possible to form both of these cams in a single metal working operation. That is, two cam blanks may be fastened together with the cam profiles being cut and finished as a single unit. Thereafter, the cams may be separated and mounted independently as hereinafter discussed. Another feature is the use of bearing mounts which permit a simple and positive preloading of the contact between the cams and cam followers and which, at the same time, will be self-compensating for minor misalignments. These bearing mounts also permit adjustments to be made quickly and easily to compensate for wear after the device has been in use.

Another feature of our invention is that it has a wide range of adaptibility to produce various combinations of dwell and indexing of the driven shaft, as related to each revolution of the driving shaft. For example, the various combinations that may be produced may include indexing periods of 120, 180 and 270 degrees of revolution of the driving shaft. The driven shaft may have 3, 4, 6 or 8 indexing stops per revolution of the driven shaft.

Other objects and advantages will become apparent from the following description taken in conjunction with the drawings, in which:

FIGURE 3 is an enlarged view of portions of the cams and cam followers of FIGURES 1 and 2 illustrating the wedging of the driven shaft during a dwell period;

FIGURE 4 is an illustration of the cams and cam followers of an alternative embodiment;

Figure 2:
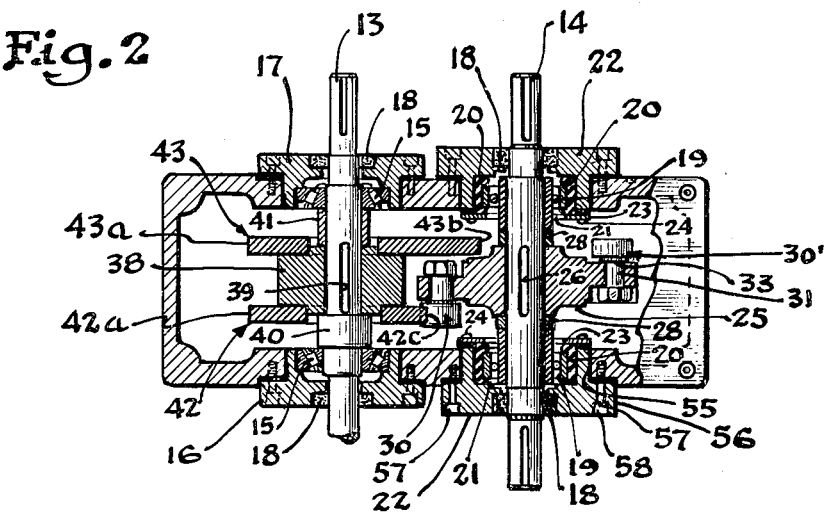
FIGURE 2 is a plan view, partially in section with the section being taken at line 2—2 of FIGURE 1.
Figure 1:
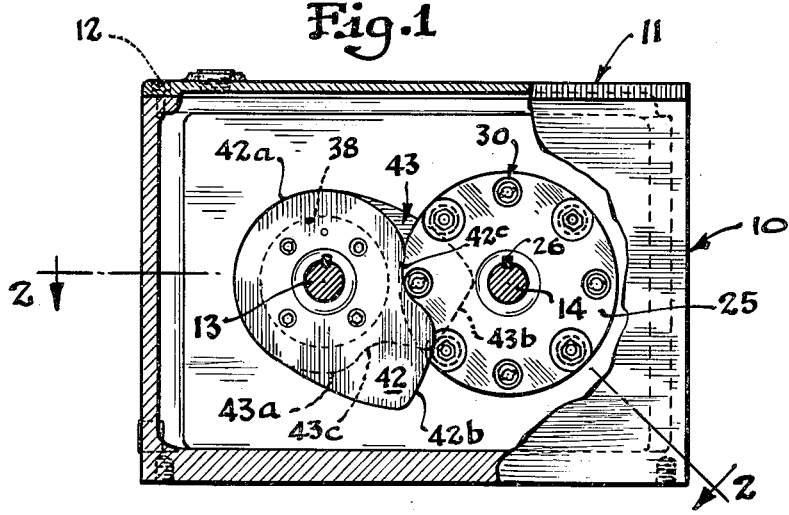
FIGURE 1 is an elevational view of an embodiment of the invention with portions thereof broken away to illustrate the cams and the cam followers.

In the embodiment illustrated in FIGURES 1 and 2, the device includes a case or frame 10 having a cover 11 held in place by a plurality of cap screws 12. Extending across the interior of case 10 are a pair of parallel shafts 13 and 14. Shaft 13 is the input or driver shaft, while shaft 14 is the output or driven shaft.

Shaft 13 is mounted in a pair of roller bearings 15 received in a pair of metal caps 16 and 17. In the illustrated embodiment shaft 13 protrudes through both sides of the case, so caps 16 and 17 are provided with oil seals 18 to prevent the loss of oil from the case. If shaft 13 protruded through but one side of the case, the cap on that side (e.g. 16 or 17) would have a solid outer face.

Shaft 14 is mounted in ball bearings 19 having an oil resistant rubber cushion 20 thereabout. The bearings 19 and cushion 20 are received in cylindrical openings 21 in caps 22. They are held in place by washers 23 held in place by screws 24. As will be seen in FIGURE 2, the washer compresses the rubber cushion about the outer race of the bearing 19 to lock that outer race in place and prevent its rotating. Oil seals 18 are provided between caps 22 and shaft 14.

Caps 22 have a projecting semi-annulus defined by an outer cylindrical surface 55 and inner cylindrical opening 21. However the axis about which surface 55 is formed is offset from the axis about which opening 21 is defined so that the opening is eccentric with respect to the outer surface 55. This semi-annulus of caps 22 is received in cylindrical openings in the walls of case 10. The flange 56 of caps 22 is provided with a plurality of openings 57. Openings 56 are equidistantly spaced about a circle. Screws 58 project through some of openings 57 and are threadably received in case 10.

Shaft 14 may be moved toward and away from shaft 13 to control the contact between the cam followers and cams, hereinafter described. This is usually done for the purposes of preloading the followers and to compensate for wear. To make the adjustment, screws 58 are removed from both of caps 32 and the caps are rotated. The eccentricity of the bearings in opening 21 with respect to cylindrical surface 55 will move shaft 14 to and/or away from shaft 13 as the caps are rotated. After the caps have been positioned as described, screws 58 are inserted in the appropriate openings 57 in caps 22 and threaded into case 10 clamping the caps in place.

Mounted on driven shaft 14 is a cam follower wheel 25. Wheel 25 is suitably affixed to shaft 14 as by means of a key 26. The position of wheel 25 on the shaft is set by a pair of sleeves 28 between the sides of wheel 25 and the bearings 19.

A plurality of cam followers generally 30 are mounted on wheel 25. The followers alternately project from opposite sides of wheel 25. The number 30 has been applied only to the followers on the front side of wheel 25, while the followers on the back side in FIGURES 1, 2 and 3 have been designated 30'. The followers are angularly positioned with respect to each other about shaft 14. (The angle between each adjacent follower is determined by dividing 360 degrees by the number of followers utilized.) The number of followers chosen will depend upon the number of stops that shaft 14 is to make during one rotation thereof. Thus, for example, the embodiment illustrated in FIGURES 1–3 is a four stop unit, while the embodiment illustrated in FIGURE 4 is a six stop unit.

Each of the followers 30 and 30' include a stub shaft 31 threaded at one end to receive a nut 32. Immediately adjacent the threaded end is a shoulder 33, which bears against one side of wheel 25 with the threaded portion of the shaft 31 protruding through the wheel and secured on the opposite side by nut 32. A cylindrical casing 34 is rotatably mounted on shaft 31 by suitable anti-friction bearings (not shown). It will be noted that the casings 34 are rotatable about axes with respect to wheel 25, which axes are parallel to the axes of shafts 14 and 13.

A cam mounting drum 38 is secured to shaft 13 by means of a key 39. Drum 38 is positioned between a shoulder 40 on shaft 13 and a sleeve 41 abutting the drum and one of the bearings 19. A pair of cams 42 and 43 are secured to drum 38 by means of bolts 44. The profile of the two cams 42 and 43 is identical, but as is apparent in FIGURES 1 and 3, the cams have been reversed and realigned to co-operate with the cam followers 30 and 30' as hereinafter described.

The cams each have a profile with a circular dwell portion 42a and 43a respectively; a rise portion 42b and 43b respectively; and a re-entrant portion 42c and 43c respectively. Referring to FIGURE 3, it will be seen that during the dwell period of shaft 14, the dwell portion 43a of cam 43 contacts one of the back followers 30' to prevent movement of shaft 14 in a counter clockwise direction. At the same time the dwell portion 42a of cam 42 contacts one of front followers 30 to prevent rotation of shaft 14 in a clockwise direction. Thus, during the dwell period shaft 14 is securely locked in place. A preloading of the cams against the cam followers may be achieved by a suitable adjustment of bushings 16 as previously described.

The rotation of shaft 14 from one stop to the next is achieved by first one of the rise portions of one of the cams contacting a respective cam follower, followed immediately by the rise portion of the other cam contacting its respective cam follower. For example, in FIGURES 2 and 3 assume that shaft 13 is rotating in a clockwise direction. In this regard it might be mentioned that one of the advantages of the applicants' device is that shaft 13 may be driven in either direction. With shaft 13 rotating in a clockwise direction from the position illustrated in FIGURE 3, the rise portion 42b (FIGURE 1) of cam 42 will contact the follower 30 at the lower left side of wheel 25 and commence moving that follower downwardly, rotating shaft 14 in a counter clockwise direction. At the same time the re-entrant portion 43c will move about the cam follower 30' at the upper left side of wheel 25. Permitting this cam follower also to move downwardly. Thereafter the rise portion 43b of cam 43 will engage the same cam follower 30' to continue the counter clockwise rotation of shaft 14. During the period of time that the rise portion 43b is engaging its follower 30', the re-entrant portion 42c of cam 42 will be receiving the follower 30 that was initially in the upper left side of the structure as illustrated in FIGURE 3. The position of the cams and followers at this time is illustrated in FIGURE 2. With the continued rotation of the cams 42 and 43 the dwell portions 42a and 43a will again engage a pair of cam followers 30 and 30' to fix the position of shaft 14 at an exact rotational position and hold it there.

Thus, for each rotation of shaft 13, shaft 14 will be indexed one step with a dwell period between each indexing. Of that one rotation of shaft 13, the dwell period for the cams 42 and 43 illustrated will be 180 degrees with the remaining 180 degrees of rotation of shaft 13 resulting in the indexing of shaft 14. Shaft 14 will move 90 degrees each time it is indexed for a total of four indexing steps for each rotation of shaft 14.

FIGURE 4 illustrates an alternative embodiment having a pair of cams 50 and 51. In this embodiment each cam has two dwell portions which are designated 50a and 51a for the respective cams, a rise portion 50b and 51b respectively, and re-entrant portions 50c and 51c respectively. In this embodiment wheel 25 carries three front cam followers 30 and three back cam followers 30'.

With each revolution of shaft 13, shaft 14 will be indexed twice with a dwell period between each indexing. Thus, assuming that shaft 13 is rotating in a clockwise direction from the position illustrated in FIGURE 4, the rise portion 50b will contact the lower left cam follower 30 to index the shaft 14 one step. During the indexing period the re-entrant portion 51c is passing by the upper left cam follower 30', illustrated in FIGURE 4. Thereafter, there is a dwell period during the time that the dwell portions 50a and 51a shown at the upper left side of FIGURE 4 are engaging two cam followers 30 and 30' respectively thus locking shaft 14 in position. Following the dwell there is another indexing step during which the rise portion 51b is moving one of the followers 30' with one of the followers 30 being received in the re-entrant portion 50c. Thereafter, there will be another dwell of shaft 14. Each indexing of shaft 14 will result in a 60 degree rotation of shaft 14 but as just pointed out there will be two of these indexings with a dwell between for each rotation of shaft 13.

Other alternatives may be employed for obtaining a resilient loading of the cam followers 30 against the surfaces of cams 42 and 43. For example, wheel 25 may be formed of a semirigid resilient material such as a relatively rigid oil resistant synthetic rubber. Another alternative would be to form wheel 25 with a hub having a series of extending spokes on which the cam followers 30 were mounted. The spokes being of a configuration to have a small amount of resiliency. In either construction the shafts 13 and 14 would be positioned close enough together initially to preload the cam followers against the cams with the resilient mounting of the cam followers maintaining that loading and correcting for minor inaccuracies in the profiles of the cams.

Figure 5:
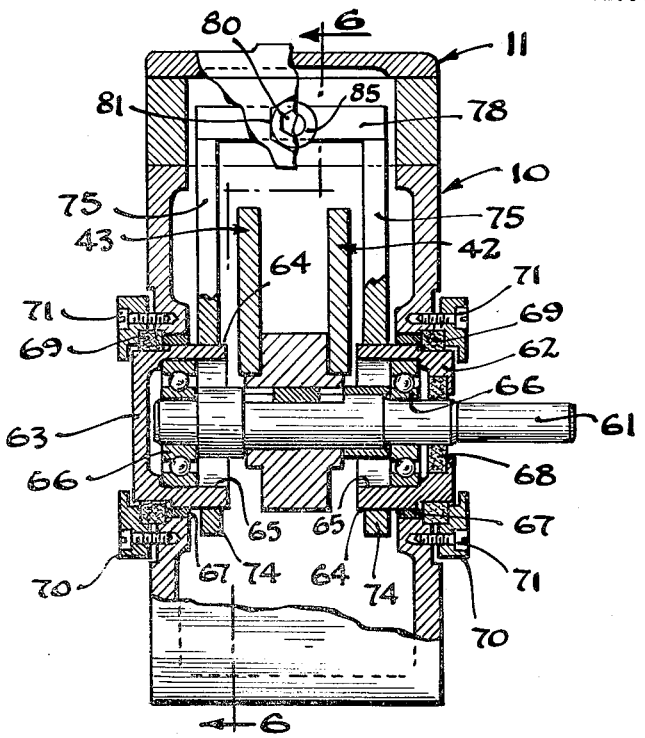
FIGURE 5 is an end elevational view, partially in section, illustrating an alternative shaft mounting.
Figure 6:
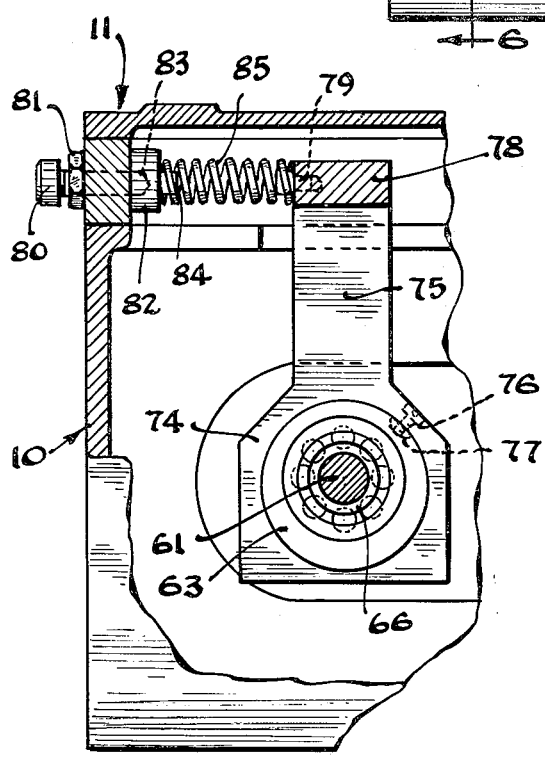
FIGURE 6 is a section as viewed along line 6—6 of FIGURE 5.

A further alternative is illustrated in FIGURES 5 and 6. In this embodiment the input shaft 61 is used to mount the cams 42 and 43 in the manner previously described. About each end of shaft 61 are sleeves 62 and 63. Each of sleeves 62 and 63 has a cylindrical outer surface 64 and a cylindrical inner opening 65. Bearings 67 rotatably mount the sleeves 62 and 63 in the frame 10. The outer bearings 67 are in contact with the outer surfaces 64 of the two sleeves. Thus, a rotational movement of the eccentric sleeves 62 and 63 on bearings 67 will move shaft 61 toward and away from the shaft on which the cam followers are mounted.

Between shaft 61 and sleeves 62 is an oil seal 68. Since cam 63 has a closed end, no oil seal is needed in the corresponding position at that end of shaft 61. Externally of sleeves 62 and 63 are oil seals 69 held in place by annular caps 70 secured to frame 10 by bolts 71.

A pair of yokes 74 having extending arms 75 are suitably attached to each of sleeves 62 and 63. They may be secured for example by set screws 76 threaded into yoke 74 and extending into recesses 77 in sleeves 62 and 63. A cross member 78 is secured to each of arms 75 and has a pin 79 projecting from the center thereof.

Opposite pin 79 in case 10 an adjusting bolt 80 having a lock nut 81 is threaded into case 10. Within the case 10 is a spring mounting member having a base 82 with a recess 83 therein to be received over the inner end of adjusting bolt 80. A pin 84 projects from base 82 directly opposite pin 79 in crossbar 78. Mounted on pins 79 and 84 is a spring 85.

From FIGURE 6 it will be seen that a rotation of yokes 74 in a clockwise direction will move shaft 61 towards the shaft on which the cam followers are mounted because of the eccentricity of sleeves 62 and 63. Thus to load the cam followers against the cams one need only release lock nut 81 and turn adjusting bolt 80 in a direction so as to move base 82 toward cross member 78. Since sleeves 62 and 63 are free to rotate in frame 10, they will tend to rotate back and forth as the pressure of cams 42 and 43 against the cam followers 30 increases or decreases respectively. This back and forth rotation will be permitted by the resiliency of spring 85 which urges the sleeves in a clockwise direction. An excess of pressure between the cam followers and the cams will act to rotate sleeves 62 and 63 in a counter clockwise direction comprising spring 85.

The foregoing description of specific embodiments is for the purpose of complying with 35 USPQ 112 and should not be construed as imposing unnecessary limitations on the appended claims inasmuch as modifications and variations of the structures described will be apparent to those skilled in the art from the foregoing description. For example, in some embodiments both of shafts 13 and 14 may be mounted for adjustable movement and/or shock cushioned as is the shaft mounting described for only shaft 14. Also, the exact cam profiles illustrated and the number of cam followers 30 and 30' employed may be varied to meet particular conditions. The cam profiles for such modifications may be developed empirically based upon the foregoing disclosure and the empirical procedures set forth in the books Cams Design, Dynamics, and Accuracy by Harold A. Rothbart, published by John Wiley & Sons (1956).

We claim:

1. An indexing cam structure comprising: a frame; a pair of shafts rotatably mounted in said frame and positioned parallel to each other, one of said shafts being the input shaft and the other being the driven shaft; a wheel attached to the driven shaft; a plurality of cam followers attached to the wheel and projecting outwardly from the sides of the wheel, each alternate follower projecting from an opposite side of said wheel a spaced angular distance from the adjacent followers; and a pair of conjugate cams attached to said input shaft, said cams being spaced to move at opposite sides of said wheel and to contact said cam followers at said opposite sides of said wheel, each of said cams having a profile with a dwell portion therein, each of said cams being in contact with one of said followers respectively during said dwell portion to fix the position of the driven shaft, each cam having a re-entrant portion in its profile at which it will move around a respective cam follower, the portions of the profiles apart from the re-entrant portions being a greater distance from the input shaft than are the profiles at the re-entrant portions.

2. An indexing cam structure comprising: a frame; a pair of shafts rotatably mounted in said frame, each shaft having a longitudinal axis, said shafts being mounted with their axes parallel to each other, one of said shafts being the input shaft and the other being the driven shaft; wheel means attached to said driven shaft; a plurality of cam followers comprising two sets of cam followers, each follower having a cylindrical follower surface, each of said followers being mounted on said wheel means and rotatable with respect to the wheel means about an axis parallel to the axis of the driven shaft, said followers being positioned with their axes at spaced intervals about said wheel means, one set of followers being in one plane normal to said axis of the driven shaft, the other set of followers being in a second plane normal to the axis of the driven shaft and spaced from said first plane and being at a different angular position about the axis of the driven shaft than is the one set of cams; and a pair of conjugate cams attached to the input shaft, each of said cams having a profile with a dwell portion therein, the profile of one cam being positioned in one of said planes and the profile of the other cam being in the other of said planes, each profile having a re-entrant portion at which the distance from the profile to the axis of the input shaft is substantially equal to the smallest distance of the follower surfaces to the axis of the input shaft as the followers move about the driven shaft, the re-entrant portion of one cam being angularly positioned with respect to the re-entrant portion of the other cam, each cam contacting a follower surface respectively during the dwell portion of the cams to fix the position of the driven shaft.

3. An indexing cam structure comprising: a frame; a pair of shafts rotatably mounted in said frame, each shaft having a longitudinal axis, said shafts being mounted with their axes parallel to each other, one of said shafts being the input shaft and the other being the driven shaft; wheel means attached to said driven shaft; a plurality of cam followers comprising two sets of cam followers, each follower having a cylindrical follower surface, each of said followers being mounted on said wheel means and rotatable with respect to the wheel means about an axis parallel to the axis of the driven shaft, said followers being positioned with their axes at spaced intervals about said wheel means, one set of followers being in a plane normal to said axis of the driven shaft, the other set of followers being in a second plane normal to the axis of the driven shaft and spaced from said first plane and being at a different angular position about the axis than is the one set of cams; and a pair of conjugate cams attached to the input shaft, each of said cams having a similar profile but being affixed to the input shaft in a different position about the shaft, each profile having a re-entrant portion at which the distance from the profile to the axis of the input shaft is substanially equal to the smallest distance of the follower surfaces to the axis of the input shaft as the followers move about the driven shaft, the re-entrant portion of one cam being angularly positioned with respect to the re-entrant portion of the other cam, the profile of one cam always maintaining contact with the surface of at least one follower of one set and the profile of the other cam always maintaining contact with the surface of at least one follower of the other set.

4. An indexing cam structure comprising: a frame; a pair of shafts rotatably mounted in said frame, each shaft having a longitudinal axis, said shafts being mounted with their axes parallel to each other, one of said shafts being the input shaft and the other being the driven shaft; a wheel attached to said driven shaft and having two sides generally normal to the axis of the driven shaft; two sets of cam followers, each set comprising an equal number of followers, each follower being mounted on said wheel and rotatable with respect to the wheel about an axis parallel to the axis of the driven shaft, the axes of each follower intersecting a common circle about the axis of the driven shaft, said followers having their axes angularly spaced about said circle with the angular spacing between each adjacent pair of axes being determined by dividing 360° by the number of followers, the followers of one set being intermediate the followers of the other set, the followers of one set projecting from one of the sides of the wheel and the followers of the other set projecting from the other side, each follower having a cylindrical follower surface; and a pair of conjugate cams attached to the input shaft, each of said cams having a similar profile but being affixed to the input shaft in a different position about the shaft, each profile having a re-entrant portion at which the distance from the profile to the axis of the input shaft is substantially equal to the smallest distance of the follower surface to the axis of the input shaft as the followers move about the driven shaft, the re-entrant portion of one cam being angularly positioned with respect to the re-entrant portion of the other cam, the profile of one cam always maintaining contact with the surface of at least one follower of one set and the profile of the other cam always maintaining contact with the surface of at least one follower of the other set.

5. An indexing cam structure comprising: a frame; a first shaft rotatably mounted in said frame; a second shaft; cam loading means including a bearing rotatably mounting said second shaft in said frame parallel to said first shaft, said cam loading means urging said second shaft towards said first shaft; one of said shafts being the input shaft and the other being the driven shaft; a wheel attached to said driven shaft and having two sides; two sets of cam followers, each follower being mounted on said wheel and rotatable with respect to the wheel about an axis parallel to the axis of the driven shaft, the axes of each follower intersecting a common circle about the axis of the driven shaft, said followers having their axes angularly spaced about said circle with the angular spacing between each adjacent pair of axes being determined by dividing 360° by the number of followers, the followers of one set being intermediate the followers of the other set, the followers of one set projecting from one of the sides of the wheel in one plane and the followers of the other set projecting from the other side in another plane, each follower having a cylindrical follower surface; and a pair of conjugate cams attached to the input shaft, each of said cams having a profile with a circular dwell portion therein, the profile of one cam being positioned in one of said planes and the profile of the other cam being in the other of said planes, each profile having a re-entrant portion at which the distance from the profile to the axis of the input shaft is substantially equal to the smallest distance of the follower surfaces to the axis of the input shaft as the followers move about the driven shaft, the re-entrant portion of one cam being angularly positioned with respect to the re-entrant portion of the other cam, each cam contacting a follower surface respectively during the dwell portion of the cams to fix the position of the driven shaft.

6. An indexing cam structure comprising: a frame; a first shaft rotatably mounted in said frame; a second shaft; cam loading means including a bearing rotatably mounting said second shaft in said frame parallel to said first shaft, said cam loading means urging said second shaft towards said first shaft; one of said shafts being the input shaft and the other being the driven shaft; a wheel attached to said driven shaft; a plurality of cam followers attached to said wheel and projecting outwardly from the sides of the wheel, each alternate follower projecting from an opposite side of said wheel and positioned a given angular distance from the adjacent followers; and a pair of conjugate cams attached to said input shaft, said cams being spaced to move at opposite sides of said wheel, each of said cams having a profile with a circular dwell portion therein, each of said cams being in contact with one of said followers respectively during said dwell portion to fix the position of the driven shaft, each cam having a re-entrant portion in its profile at which it will move around a cam follower positioned about in a line between the two shafts, the portions of the profiles apart from the re-entrant portions being a greater distance from the input shaft than are the profiles at the re-entrant portions.

7. An indexing cam structure comprising: a frame; a pair of shafts rotatably mounted in said frame and positioned parallel to each other, one of said shafts being the input shaft and the other being the driven shaft, at least one of said shafts being resiliently mounted in said frame; a wheel attached to said driven shaft; a plurality of cam followers attached to said wheel and projecting outwardly from the sides of the wheel, each alternate follower projecting from an opposite side of said wheel and positioned a given angular distance from the adjacent followers; and a pair of conjugate cams attached to said input shaft, said cams being spaced to move at opposite sides of said wheel, each of said cams having a profile with a circular dwell portion therein, each of said cams being in contact with one of said followers respectively during said dwell portion to fix the position of the driven shaft, each cam having a re-entrant portion in its profile at which it will move around a cam follower positioned about in a line between the two shafts, the portions of the profiles apart from the re-entrant portions being a greater distance from the input shaft than are the profiles at the re-entrant portions.

8. An indexing cam structure comprising: a frame; a first shaft rotatably mounted in said frame; a second shaft; mounting means for said second shaft including a pair of sleeves, a pair of bearings between said sleeves respectively and said frame, a pair of bearings between said sleeves respectively and said shaft, the bearings between said sleeves and said frame being eccentrically positioned with respect to the bearings between said sleeves and said shaft, and resilient means between said sleeves and said frame urging said sleeves in one direction of rotation with respect to said frame; one of said shafts being the input shaft and the other being the driven shaft; a wheel attached to said driven shaft; a plurality of cam followers attached to said wheel and projecting outwardly from the sides of the wheel, each alternate follower projecting from an opposite side of said wheel and positioned a given angular distance from the adjacent followers; and a pair of conjugate cams attached to said input shaft, said cams being spaced to move at opposite sides of said wheel, each of said cams having a profile with a circular dwell portion therein, each of said cams being in contact with one of said followers respectively during said dwell portion to fix the position of the driven shaft, each cam having a re-entrant portion in its profile at which it will move around a cam follower positioned about in a line between the two shafts, the portions of the profiles apart from the re-entrant portions being a greater distance from the input shaft than are the profiles at the re-entrant portions.

9. An indexing cam structure comprising: a frame; a pair of shafts rotatably mounted in said frame and positioned parallel to each other, one of said shafts being the input shaft and the other being the driven shaft; a wheel attached to the driven shaft; a plurality of cam followers attached to the wheel and projecting outwardly from the sides of the wheel, each alternate follower projecting from an opposite side of said wheel a spaced angular distance from the adjacent followers; and a pair of conjugate cams attached to said input shaft, said cams being spaced to move at opposite sides of said wheel and to contact said cam followers at said opposite sides of said wheel, each of said cams having a profile with a dwell portion therein, each of said cams being in contact with one of said followers respectively during said dwell portion to fix the position of the driven shaft, each cam having a re-entrant portion in its profile at which it will move around a respective cam follower, the portions of the profiles apart from the re-entrant portions being a greater distance from the input shaft than are the profiles at the re-entrant portions; and means to cushion the contact of the cam followers with the cams.

References Cited in the file of this patent
UNITED STATES PATENTS

| | | |
|---|---|---|
| 2,352,608 | Archer | July 4, 1944 |
| 2,353,884 | Eves et al. | July 18, 1944 |